(12) United States Patent
Poole

(10) Patent No.: US 11,334,859 B2
(45) Date of Patent: May 17, 2022

(54) SYSTEM AND METHOD FOR RETAIL MANAGEMENT OF CONTROLLED SUBSTANCES

(71) Applicant: Poole Technologies LTD., Balgonie (CA)

(72) Inventor: Brandon Joseph Poole, Balgonie (CA)

(73) Assignee: Poole Technologies LTD., Balgonie (CA)

( * ) Notice: Subject to any disclaimer, the term of this patent is extended or adjusted under 35 U.S.C. 154(b) by 0 days.

(21) Appl. No.: 16/948,728

(22) Filed: Sep. 30, 2020

(65) Prior Publication Data

US 2021/0117946 A1 Apr. 22, 2021

Related U.S. Application Data

(60) Provisional application No. 62/916,498, filed on Oct. 17, 2019.

(51) Int. Cl.
*G06Q 20/20* (2012.01)
*G06Q 30/00* (2012.01)

(52) U.S. Cl.
CPC ......... *G06Q 20/202* (2013.01); *G06Q 30/016* (2013.01); *G06Q 30/018* (2013.01)

(58) Field of Classification Search
CPC .. G06Q 20/202; G06Q 30/018; G06Q 30/016; G06Q 20/20; G06Q 20/4014

USPC .......................................................... 705/21
See application file for complete search history.

(56) References Cited

U.S. PATENT DOCUMENTS

| | | |
|---|---|---|
| 2006/0282344 A1 | 12/2006 | Brown |
| 2008/0004966 A1 | 1/2008 | Singleton et al. |
| 2009/0157515 A1 | 6/2009 | Lafauci et al. |
| 2016/0321677 A1* | 11/2016 | Dobaj ................ G06Q 30/0185 |
| 2018/0130071 A1* | 5/2018 | Yao .................... G06Q 30/0185 |

* cited by examiner

*Primary Examiner* — Garcia Ade
(74) *Attorney, Agent, or Firm* — Bereskin & Parr LLP/S.E.N.C.R.L., s.r.l.

(57) ABSTRACT

A method and system for retail management of controlled substances is provided. Controlled substances such as alcohol or cannabis may be sold as products or served at a venue. The process of purchasing the controlled substance, or service of a controlled substance the current venue includes a customer presenting the controlled substance for purchase and providing a customer identifier. The point of sale device at the venue may send an authorization request to a processing server at a remote service, which may reply with an advisory response including information from a customer profile. Optionally, a system and method of retail management of controlled substances provides for a law enforcement system may send an investigation request comprising a vehicle identifier to the processing server, and in response an investigation response may be sent to the law enforcement system may be sent including information from the customer profile.

20 Claims, 7 Drawing Sheets

SYSTEM AND METHOD FOR RETAIL MANAGEMENT OF CONTROLLED SUBSTANCES

CROSS-REFERENCE TO RELATED APPLICATION

This application claims the benefit of U.S. Provisional Application No. 62/916,498 filed on Oct. 17, 2019, which is incorporated by reference herein in its entirety.

FIELD

The described embodiments relate to the management of sales of controlled substances such as alcohol and cannabis by vendors.

BACKGROUND

Vendors that sell controlled substances such as alcohol and cannabis, including restaurants and retailers, have many obligations in their role serving these products to the public. These obligations may exist because of the conditions of the vendor's license to sell the controlled substance, may relate to legal liability for the actions of customers sold to or served in excess, and may relate to ethical obligations held by the vendor to act diligently and as a good member of the community.

The obligations may include an obligation to monitor the amount of controlled substances purchased by a customer, and to discontinue serving a controlled substance based on the level of consumption by a customer. Another obligation includes not serving or selling to customers a particular controlled substances if they have already consumed an excess of the particular controlled substance, including where the consumption occurred at a prior vendor. Finally, another obligation may be to deny entry into an establishment to customers who have already consumed an excess of a particular controlled substance.

In their road safety role, law enforcement officers may also face similar obligations in stopping vehicles driven by customers who have consumed an excess of a controlled substance. The officers may be required to make a judgement call about the suspicion of a particular driver's consumption based on factors unrelated to the actual purchase history of the driver.

Traditionally, these obligations are met by diligent salespeople, restaurant staff, and other employees during the process of purchase or while serving. The obligations are often met, for example, by a restaurant server recalling a number of drinks that each patron has ordered and consumed. Further, a salesperson may smell alcohol or other substances on a customer's breath, or may make a judgement call based upon a customer's behavior or demeanor.

For law enforcement officers, judgment to pull over a vehicle may be made based on the vehicle's driving pattern, visual indicators of the driver's consumption, etc. that are unrelated to the driver's actual purchase history.

It is therefore desired to provide an improved system and method to assist restaurant employees and law enforcement officers in discharging their obligations to the public with respect to these customers.

SUMMARY

In a first aspect there is provided a method for retail management of controlled substances at a current venue, the current venue comprising a current point-of-sale device, the method comprising: receiving, at a processing server from a prior point-of-sale device, a prior authorization request comprising one or more prior product identifiers corresponding to one or more prior controlled substance products presented for purchase at the prior point-of-sale device, and a customer identifier presented by the customer purchasing the one or more prior controlled substance products at the prior point-of-sale device; generating, at the processing server, a corresponding customer profile associated with the customer identifier, and the one or more prior product identifiers in the prior authorization request; receiving, at a processing server from the current point-of-sale device, a current authorization request comprising one or more current product identifiers corresponding to one or more current controlled substance products presented for purchase at the current point-of-sale device, and the customer identifier presented by the customer purchasing the one or more current controlled substance products at the current point-of-sale device; determining, at the processing server, the corresponding customer profile associated with the customer identifier; updating, at the processing server, the corresponding customer profile with the one or more current product identifiers in the current authorization request; transmitting, from the processing server to the current point-of-sale device, an advisory response corresponding to the current authorization request and the corresponding customer profile based on the one or more current product identifiers and the one or more prior product identifiers.

In at least one embodiment, the advisory response may be further based on a time of purchase of the one or more prior controlled substance products represented by the one or more prior product identifiers.

In at least one embodiment, the advisory response may be further based on a prior location type of the prior venue.

In at least one embodiment, the advisory response may be further based on a current location type of the current venue.

In at least one embodiment, the advisory response may be further based on a distance between the first venue and the second venue.

In at least one embodiment, the advisory response may be further based on a transportation type used between the first venue and the second venue.

In at least one embodiment, the advisory response may be further based on a product type corresponding to the one or more current product identifiers and the one or more prior product identifiers.

In at least one embodiment, the advisory response may be further based on a container indicia of the one or more current controlled substance products represented by the one or more current product identifiers and a container indicia of the one or more prior controlled substance products represented by one or more prior product identifiers.

In a second aspect, there is provided a system for retail management of controlled substances at a current venue, the current venue comprising a current point-of-sale device, the method comprising: a processing server, the processing server comprising: a memory; a network device; and a processor in communication with the memory and the network device, the processor configured to: receive, at the network device from a prior point-of-sale device, a prior authorization request comprising one or more prior product identifiers corresponding to one or more prior controlled substance products presented for purchase at the prior point-of-sale device, and a customer identifier presented by the customer purchasing the one or more prior controlled substance products at the prior point-of-sale device; generate a corresponding customer profile associated with the customer identifier, and the one or more prior product identifiers in the prior authorization request; receive, at the network device from the current point-of-sale device, a current authorization request comprising one or more current product identifiers corresponding to one or more current controlled substance products presented for purchase at the current point-of-sale device, and the customer identifier presented by the customer purchasing the one or more current controlled substance products at the current point-of-sale device; determine the corresponding customer profile associated with the customer identifier; update the corresponding customer profile with the one or more current product identifiers in the current authorization request; transmit, from network device to the current point-of-sale device, an advisory response corresponding to the current authorization request and the corresponding customer profile based on the one or more current product identifiers and the one or more prior product identifiers.

In at least one embodiment, the advisory response may be further based on a time of purchase of the one or more prior controlled substance products represented by the one or more prior product identifiers.

In at least one embodiment, the advisory response may be further based on a prior location type of the prior venue.

In at least one embodiment, the advisory response may be further based on a current location type of the current venue.

In at least one embodiment, the advisory response may be further based on a distance between the first venue and the second venue.

In at least one embodiment, the advisory response may be further based on a transportation type used between the first venue and the second venue.

In at least one embodiment, the advisory response may be further based on a product type corresponding to the one or more current product identifiers and the one or more prior product identifiers.

In at least one embodiment, the advisory response may be further based on a container indicia of the one or more current controlled substance products represented by the one or more current product identifiers and a container indicia of the one or more prior controlled substance products represented by one or more prior product identifiers.

In a third aspect, there is provided a method for retail management of controlled substances at a first venue, the first venue comprising a first point-of-sale device, the method comprising: receiving, at a processing server from the first point-of-sale device, an authorization request comprising one or more product identifiers corresponding to one or more controlled substance products presented for purchase at the first point-of-sale device, and a customer identifier presented by the customer purchasing the one or more controlled substance products at the first point-of-sale device; determining, at the processing server, a corresponding customer profile associated with the customer identifier; updating, at the processing server, the corresponding customer profile with the one or more product identifiers in the authorization request; transmitting, from the processing server to the first point-of-sale device, an advisory response corresponding to the authorization request and the corresponding customer profile; receiving, at the processing server from a law enforcement system, an investigation request comprising a vehicle identifier; determining, at the processing server, an investigation customer identifier corresponding to the vehicle identifier; and transmitting, from the processing server to the law enforcement system, an investigation response corresponding to the investigation request, the investigation response comprising an investigation customer profile corresponding to the investigation customer identifier.

In at least one embodiment, the customer identifier may be a government issued identifier.

In at least one embodiment, the law enforcement system may be an optical license plate scanner.

In at least one embodiment, the determining, at the processing server, the corresponding customer profile associated with the customer identifier may further comprise determining if there is not an existing customer profile and creating a new customer profile corresponding to the customer identifier.

In at least one embodiment, the advisory response may further comprise an authorization status, the authorization status comprising a success, a warning, or a failure.

In at least one embodiment, the updating, at the processing server, the corresponding customer profile with the one or more product identifiers in the authorization request may further comprise updating the corresponding customer profile with a transaction time, one or more product type identifiers corresponding to the one or more product identifiers, and a venue identifier corresponding to the first venue.

In at least one embodiment, the customer profile and the investigation customer profile may further comprise historical purchase information for the customer.

In at least one embodiment, the method may further comprise: determining, at the processing server, if the customer profile contains historical purchase information from before a time threshold; and removing any historical purchase information associated with the customer profile before the time threshold.

In at least one embodiment, the method may further comprise: transmitting, from the processing server to a correctional system, a correctional query request, the correctional query request comprising the customer identifier; receiving, at the processing server from the correctional system, a correctional query response corresponding to the correctional query request, the correctional query response comprising a parole status indicia corresponding to the customer identifier; and upon receiving the correctional query response status comprising an active parole indicia, generating the advisory response with the authorization status of failure.

In at least one embodiment, the method may further comprise: providing the customer with a wearable device comprising a wearable identifier; storing the wearable identifier in association with the customer profile; and wherein the customer identifier presented by the customer purchasing the one or more controlled substance products at the first point-of-sale is the wearable identifier.

In at least one embodiment, the retail environment may further comprise a second point-of-sale device located at a second venue, the method may further comprise: receiving, at the processing server from the second point-of-sale device, a second authorization request comprising the another one or more product identifiers corresponding to another one or more controlled substance products presented for purchase at the second point-of-sale device, and a second customer identifier presented by the customer purchasing the another one or more controlled substance products at the second point-of-sale device; determining, at the processing server, a corresponding second customer profile associated with the customer identifier; updating, at the processing server, the second corresponding customer profile with the another one or more product identifiers in the second authorization request; transmitting, from the processing server to the second point-of-sale device, a second advisory response corresponding to the second authorization request and the corresponding second customer profile; and wherein if the first customer identifier and the second customer identifier are the same, the second advisory response to the second point-of-sale device may comprise the one or more product identifiers and the another one or more product identifiers.

In a fourth aspect, there is provided a system for retail management of controlled substances in a retail environment, the retail environment comprising a first point-of-sale device, the system comprising: a processing server in network communication with the first point-of-sale device, the processing server comprising: a memory, the memory comprising a database; a processor in communication with the memory, the processor configured to: receive from the first point-of-sale device, an authorization request comprising one or more product identifiers corresponding to one or more controlled substance products presented for purchase at the first point-of-sale device, and a customer identifier presented by the customer purchasing the one or more controlled substance products at the first point-of-sale device; determine a corresponding customer profile in the database associated with the customer identifier; update the corresponding customer profile in the database with the one or more product identifiers in the authorization request; transmit an advisory response corresponding to the authorization request and the corresponding customer profile to the first point-of-sale device; receive an investigation request comprising a vehicle identifier from a law enforcement system; determine an investigation customer identifier corresponding to the vehicle identifier; and transmit an investigation response corresponding to the investigation request to the law enforcement system, the investigation response comprising an investigation customer profile corresponding to the investigation customer identifier.

In at least one embodiment, the customer identifier may be a government issued identifier.

In at least one embodiment, the law enforcement system may be an optical license plate scanner.

In at least one embodiment, the processor may be further configured to determine if there is not an existing customer profile in the database and creating a new customer profile corresponding to the customer identifier in the database.

In at least one embodiment, the advisory response may further comprise an authorization status, the authorization status comprising a success, a warning, or a failure.

In at least one embodiment, the customer profile and the investigation customer profile may further comprise historical purchase information for the customer.

In at least one embodiment, the processor may be further configured to: determine if the customer profile contains historical purchase information from before a time threshold; and remove any historical purchase information associated with the customer profile in the database before the time threshold.

In at least one embodiment, the processor may be further configured to: transmit a correctional query request to a correctional system, the correctional query request comprising the customer identifier; receive a correctional query response corresponding to the correctional query request from the correctional system, the correctional query response comprising a parole status indicia corresponding to the customer identifier; and upon receiving the correctional query response status comprising an active parole indicia, generating the advisory response with the authorization status of failure.

In at least one embodiment, the system may further comprise: a wearable device comprising a wearable identifier readable by the first point-of-sale device; and wherein the processor may be further configured to: store the wearable identifier in association with the customer profile; and wherein the customer identifier presented by the customer purchasing the one or more controlled substance products at the first point-of-sale device is the wearable identifier.

In at least one embodiment, the retail environment may further comprise a second point-of-sale device located at a second venue, wherein the processor may be further configured to: receive a second authorization request from the second point-of-sale device, the second authorization request comprising another one or more product identifiers corresponding to another one or more controlled substance products presented for purchase at the second point-of-sale device, and a second customer identifier presented by the customer purchasing the another one or more controlled substance products at the second point-of-sale device; determine a corresponding customer profile associated with the second customer identifier in the database; updating the corresponding second customer profile in the database with the another one or more product identifiers in the second authorization request; transmitting a second advisory response to the second point-of-sale device, the second advisory response corresponding to the second authorization request and the corresponding second customer profile; and wherein if the first customer identifier and the second customer identifier are the same, the second advisory response to the second point-of-sale device may comprise the one or more product identifiers and the another one or more product identifiers.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
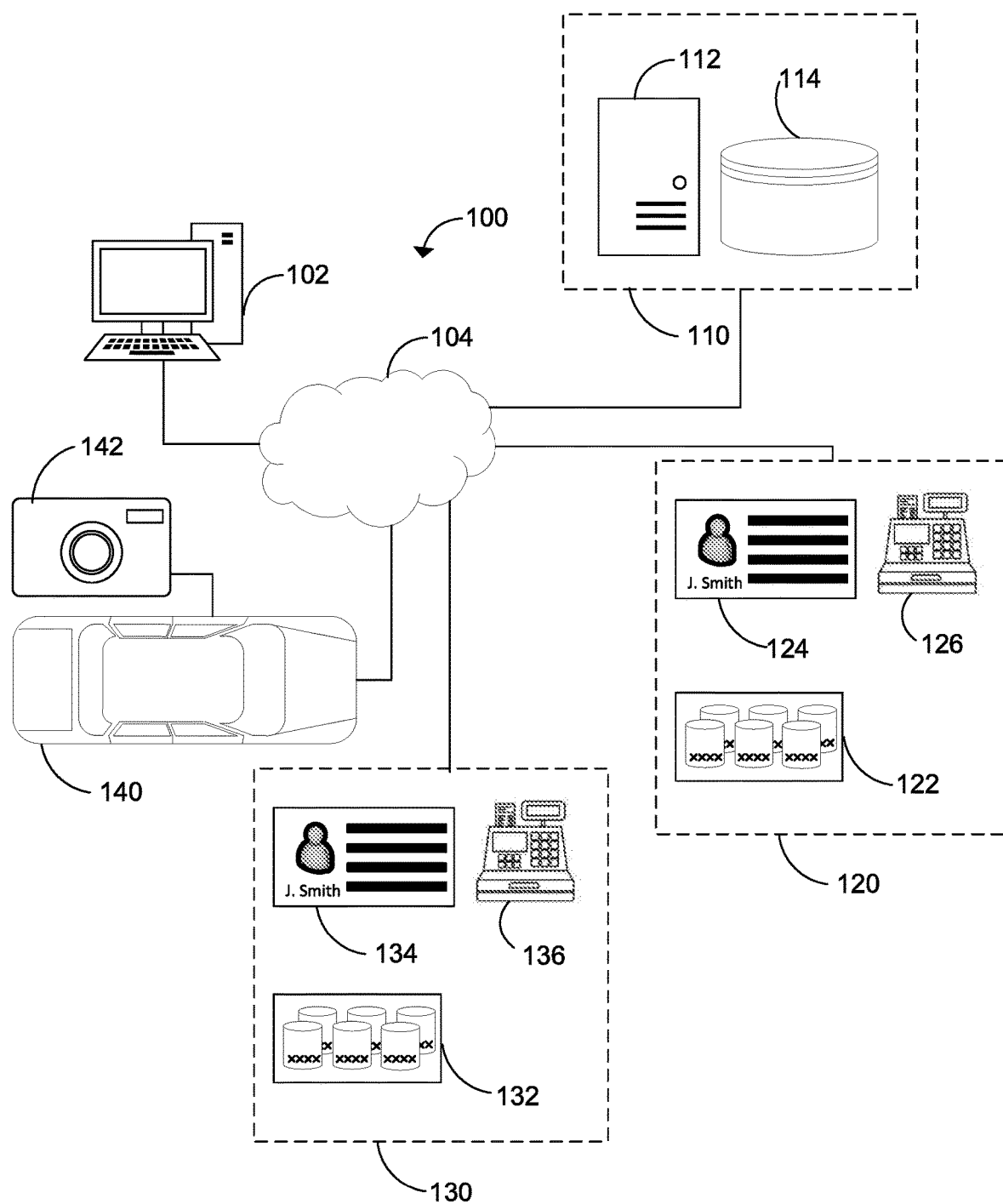
FIG. 1 is a system diagram of the retail management system.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and a combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

Reference is first made to FIG. 1, there is shown a system diagram 100 for a retail management system. The retail management system includes one or more user devices 102, a network 104, a remote service 110, a first venue 120, an optional second venue 130, and an optional law enforcement vehicle 140 having a vehicle license plate scanner 142.

The one or more user devices 102 may be used by an end user to access a software application (not shown) running on processing server 112 at remote service 110 over network 104. For example, the application may be a web application, or a client/server application. The user device 102 may be a desktop computer, mobile device, or laptop computer. The user device 102 may be in communication with processing server 112, and may allow a user to review user profiles stored in database 114. The user at user device 102 may also be an administrator user who may administer the configuration of the retail management system using a web application at processing server 112.

Network 104 may be a communication network such as the Internet, a Wide-Area Network (WAN), a Local-Area Network (LAN), or another type of network. Network 104 may include a point-to-point connection, or another communications connection between two nodes.

The remote service 110 is in network communication with the first venue 120, the second venue 130, the user device 102, and the law enforcement system 140. The remote service 110 may have a processing server 112 and a database 114. The database 114 and the processing server 112 may be provided on the same server, may be configured as virtual machines, or may be configured as containers. The remote server 110 may run on a cloud provider such as Amazon® Web Services (AWS®).

The processing server 112 may host a web application or an Application Programming Interface (API) endpoint that the user device 102 may interact with via network 104. Further, the processing server 112 may provide API endpoints for the first point-of-sale 126 and the second point-of-sale 136 to call. The processing server 112 may make calls to the first point-of-sale 126 at the first venue 120, the second point-of-sale 136 at the second venue 130, or the law enforcement system. Further, the processing server 112 may make calls to the database 114 to query data on customers, transactions, or products.

The API endpoints provided by processing server 112 may allow for a plurality of venues, including venues from a plurality of different organizations to make requests to determine the purchase history of a user for one or more controlled products. The requests made to the API endpoint of processing server 112 may be made in a variety of different formats, such as JavaScript Object Notation (JSON) or eXtensible Markup Language (XML).

The database 114 may store customer information including purchase history, transaction information, vehicle information, and product information. The database 114 may be a Structured Query Language (SQL) such as PostgreSQL or MySQL or a not only SQL (NoSQL) database such as MongoDB.

The first venue 120 may be a restaurant, a bar, a retailer, a grocery store, a government owned liquor store, a privately owned liquor store, a brewery, a vineyard, a dispensary, a pharmacy, or any other provider of goods or services including controlled substances.

The first venue 120 has a first point-of-sale device 126 that is in communication with network 104 and remote service 110 via network 104. The first point-of-sale device may have a display for showing a user interface and additional information to an employee at the first venue 120. At the first venue 120, a customer may present a controlled substance 122 for purchase at the first point-of-sale device 126. The controlled substance 122 may be a packaged product that is regulated and/or government controlled. The controlled substance 122 may be a six-pack of beer, for example. For the purposes of this example, the sale and service of alcohol related products will be used, however it is understood that the controlled substances may include psychoactive products such as Cannabis, pharmaceutical products such as opiate-based painkillers, or any other controlled substance.

The customer may present identification 124 at the first point-of-sale device 126 at the time of purchase of the controlled substance 122. The identification 124 may be government issued identification such as a driver's license, a health card, a social insurance card, a passport, etc.

During the purchase of the controlled substance 122, one or more product identifiers corresponding to the controlled substance 122 may be read by the first point-of-sale device 126.

During the purchase of the controlled substance 122, the identification 124 is read by the first point-of-sale device 126. Once read by the first point-of-sale device 126, the identifier of identification 124 may be transmitted from the first point-of-sale device 126 along with the one or more product identifiers to the remote service 110 to request an advisory response about the customer. Based on the advisory response, the customer at the first point of sale device 126 may be refused purchase by a sales employee at the first venue.

Based on the advisory response, the customer at the first point of sale device 126 may be refused purchase of the controlled substance 122 by a sales employee at the first venue 120. The sales employee at the first point of sale device 126 may indicate a refusal of service of the customer at the point of sale device 126, and this refusal of service may be transmitted to the remote service 110 and stored in the customer profile database in association with the customer.

The request for advisory response about the customer based on the identification 124 may be included in an authorization request at the first point-of-sale 126 in the payment processing of the customer's payment card in order to fund the purchase of the controlled substance 122.

The second venue 130 may be another restaurant, a bar, a retailer, a grocery store, a government owned liquor store, a privately owned liquor store, a brewery, a vineyard, a dispensary, a pharmacy, or any other provider of goods or services including controlled substances.

The second venue 130 has a second point-of-sale device 136 that is in communication with network 104 and remote service 110 via network 104. At the second venue 130, a customer may present a controlled substance 132 for purchase at the point-of-sale device 136. The controlled substance 132 may be a packaged product that is regulated and/or government controlled. The controlled substance 132 may be six bottles of wine, for example.

The customer may present identification 134 at the second point-of-sale device 136 at the time of purchase of the controlled substance 132. The identification 134 may be government issued identification such as a driver's license, a health card, a social insurance card, a passport, etc. When the same customer first purchases controlled substance 122 at first venue 120, and then later attempts to purchase controlled substance 132 at the second venue 130, the identification 124 and the identification 134 may be the same.

During the purchase of the controlled substance 132, one or more product identifiers corresponding to the controlled substance 132 may be read by the second point-of-sale device 136.

During the purchase of the controlled substance 132, the identification 134 is read by the second point-of-sale device 136. Once read by the first point-of-sale device 136, the identifier of identification 134 may be transmitted from the first point-of-sale device 136 along with the one or more product identifiers to the remote service 110 to request advisory response about the customer.

Based on the advisory response, the customer at the second point of sale device 136 may be refused purchase of the controlled substance 132 by a sales employee at the second venue 130. The sales employee at the second point of sale device 136 may indicate a refusal of service of the customer at the point of sale device 136, and this refusal of service may be transmitted to the remote service 110 and stored in the customer profile database in association with the customer.

In a further embodiment, the advisory response may further include a theft indicator for the customer identifier used by the customer, which may indicate if the customer identifier has been stolen.

In a further embodiment, the advisory response received at the second point of sale device 136 may include a success status, a warning status, or a failure status. The point of sale device 136 may report to the remote service 110 an action taken by the venue 130. For example, if the advisory response includes a failure status, and a transaction is subsequently performed at second venue 130 for the controlled substance 132 to the customer identified by customer identifier 134, this action may be reported to the remote service 110.

The remote service 110 may identify a matching customer profile in database 114 based on the customer identification 134, where the customer identification 134 is the same as customer identification 124.

In an alternate embodiment the identification 124 and identification 134 may be different government issued identifiers associated with the same customer. In this case, the remote server 110 may perform matching of the identifier 124 from the first venue 120, and the identifier 134 from the second venue 130 to determine a matching customer profile in database 114 at remote service 110.

The request for advisory response about the customer based on the identification 134 may be included in an authorization request at the point-of-sale 136 in the payment processing of the customer's payment card in order to fund the purchase of the controlled substance 132. The advisory response provided to the point-of-sale system 136 at second venue 130 about the purchase of controlled substance 132 at the second venue 130 may include the purchase history of the controlled substance 122 at first venue 120. The advisory response received at the second venue 130 from the remote service 110 in response to the authorization request may further include one or more further details of the purchase at the first venue 120, including a time of purchase of the regulated product 122 at the first venue 120, a location type of the first venue 120 (for example, if the first venue 120 is a restaurant, bar, grocery store, etc), a location type of the second venue 130 (for example, if the second venue 130 is a restaurant, bar, grocery store, etc.), a distance from the physical location of the first venue 120 and the second venue 130, a transportation type used by the customer between the first venue 120 and the second venue 130, a product type of the regulated product 122 or the regulated product 132, other transaction data from the purchase of the controlled product 122 at first venue 120, whether the customer has been previously refused service or sales at other venues (for example, if the customer is refused service at the first venue 120), and a container indicia of the controlled product 122 (for example, was the substance sold in an open container versus a closed one, requiring the customer to consume the product at the first venue 120 instead of carrying out the controlled product).

The advisory response about the customer based on the controlled products 132 presented for purchase at the second venue 130 may allow an employee at the second venue 130 to make an informed decision about whether to proceed with the purchase of the controlled products 132 or to continue to serve the customer controlled products 132, or whether to refuse service or sales of the controlled products 132.

The first venue 120 and the second venue 130 may be independent of each other, for example, the first venue may be a grocery store and the second venue may be a restaurant. Alternatively, the first venue 120 and the second venue 130 may be different locations of the same organization.

Optionally, a law enforcement system 140 used by a law enforcement officer, including a mobile license plate scanning device 142 may be in network communication with remote service 110. The mobile license plate scanning device 142 at law enforcement system 140 may automatically scan the vehicle license plates of vehicles in proximity to the law enforcement office operating the law enforcement system 140. In one example, the mobile license plate scanning device 142 may be mounted on a law enforcement vehicle, and may automatically capture and identify license plate identifiers, for example, using a camera externally mounted on the law enforcement vehicle. The law enforcement system 140 may determine from a license plate identifier, an identifier for a driver corresponding to a government issued identifier such as a driver's license. The law enforcement system 140 may transmit an investigation request to the remote service 110 to query the database 114 for the user profile corresponding to the government issued identifier determined from a vehicle using the license plate scanner 142. In response, the remote service 110 may transmit an investigation response to the law enforcement system 140 for a law enforcement officer to review.

The investigation response provided to the law enforcement system 140 about the driver associated with the identified license plate may include the purchase history of the controlled substance 122 at first venue 120 and the controlled substance 132 at the second venue 130. The investigation response received at the law enforcement system 140 from the remote service 110 in response to the investigation request may further include one or more further details of the purchase at the first venue 120, the purchase at the second venue 130, including a time of purchase of the regulated product 122 at the first venue 120, a time of purchase of the regulated product 132 at the second venue 130, a location type of the first venue 120 (for example, if the first venue 120 is a restaurant, bar, grocery store, etc), a location type of the second venue 130 (for example, if the second venue 130 is a restaurant, bar, grocery store, etc), a distance from the current location of the law enforcement system 140 to the physical location of the first venue 120, a distance from the current location of the law enforcement system 140 to the physical location of the second venue 130, a transportation type used by the customer between the first venue 120 and the second venue 130, a transportation type used by the customer between the second venue 130 and the current location of the law enforcement system 140, a product type of the regulated product 122 or the regulated product 132, other transaction data from the purchase of the controlled product 122 at first venue 120, other transaction data from the purchase of the controlled product 132 at first venue 130, a container indicia (for example, was the substance sold in an open container versus a closed one, requiring the customer to consume the product at the first venue 120 instead of carrying out the controlled product) of the controlled product 122.

The advisory response about the customer based on the controlled products 132 presented for purchase at the second venue 130 may allow an employee at the second venue 130 to make an informed decision about whether to proceed with the purchase of the controlled products 132 or to continue to serve the customer controlled products 132, or to refuse the customer the purchase of the controlled products 132. In a further embodiment, the advisory response may further include a theft indicator for the customer identifier used by the customer, which may indicate if the customer identifier has been stolen.

Figure 2:
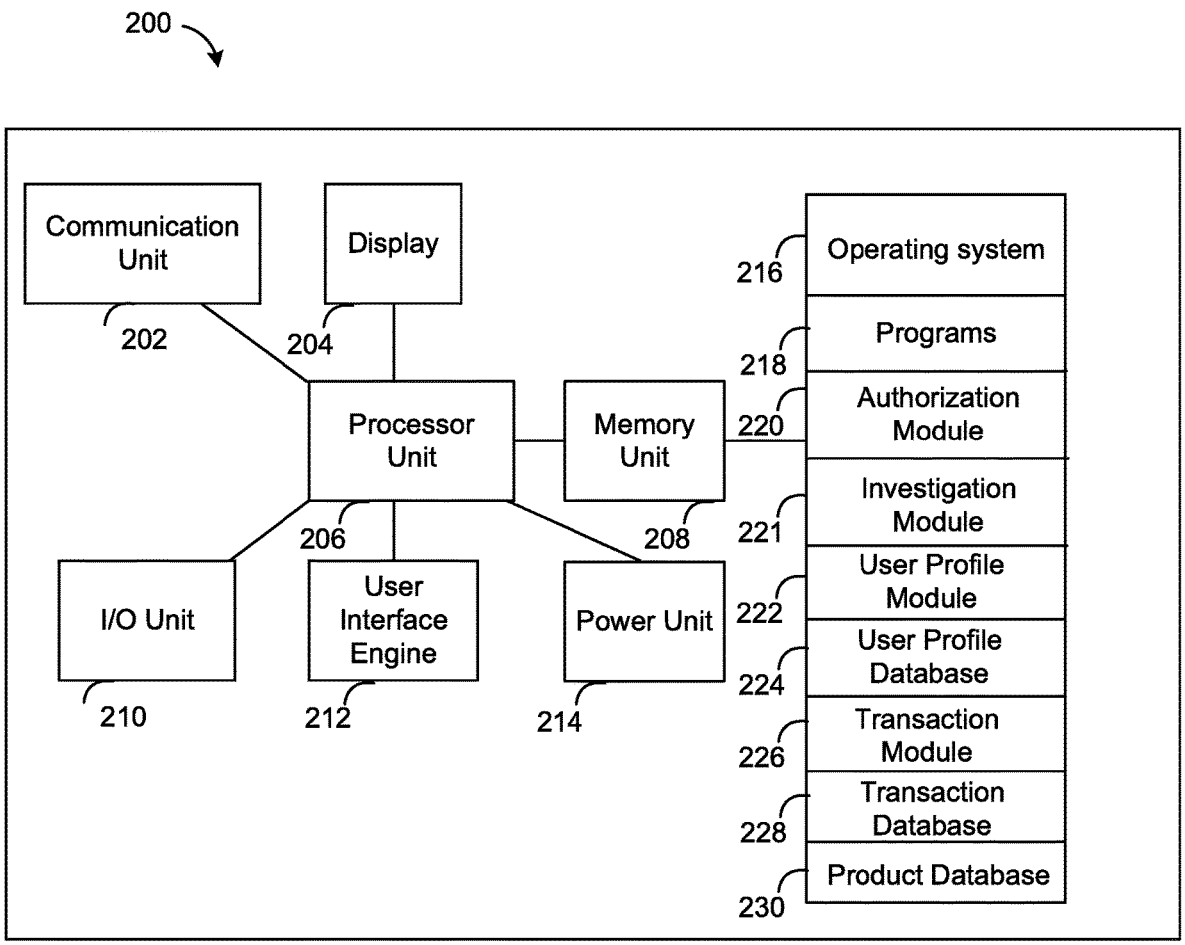
FIG. 2 is a block diagram of the remote service 110 including processing server 112 and database 114 from FIG. 1.

Reference is next made to FIG. 2, showing a block diagram 200 of the remote service 110 including processing server 112 and database 114 from FIG. 1. The remote service 110 has a processing server 112 and a database 114. The processing server 112 and the database 114 may be located on the same server (as shown in FIG. 2), or on different servers that are in network communication with each other. The processing server 112 and the database 114 may be virtual machines, or containers as is known. The processing server 112 and the database 114 may be hosted on a cloud provider such as Amazon® Web Services (AWS®). The remote service 110 has communication unit 202, display 204, processor unit 206, memory unit 208, I/O unit 210, user interface engine 212, and power unit 214. The memory unit 208 has operating system 216, programs 218, authorization module 220, investigation module 221, user profile module 222, user profile database 224, transaction module 226, transaction database 228, and product database 230.

The communication unit 202 may be a standard network adapter such as an Ethernet or 802.11x adapter. The processor unit 206 may include a standard processor, such as the Intel Xeon processor, for example. Alternatively, there may be a plurality of processors that are used by the processor unit 206 and may function in parallel.

Figure 6A:
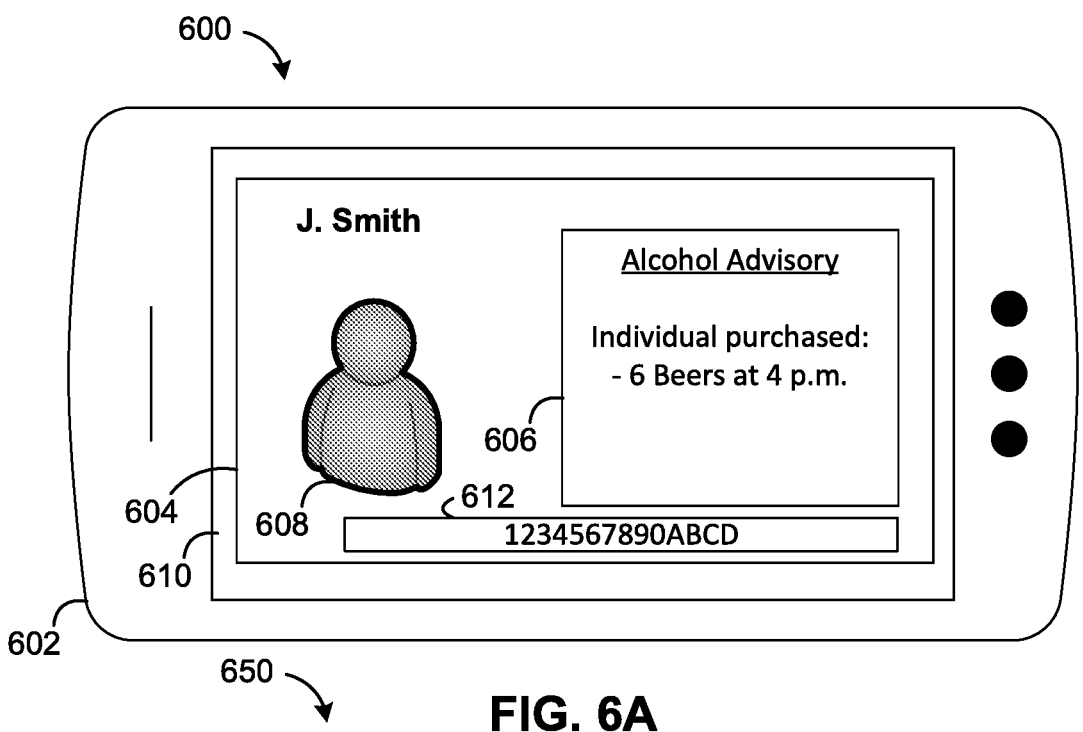
FIG. 6A is a user interface showing an advisory message of a retail management system.
Figure 6B:
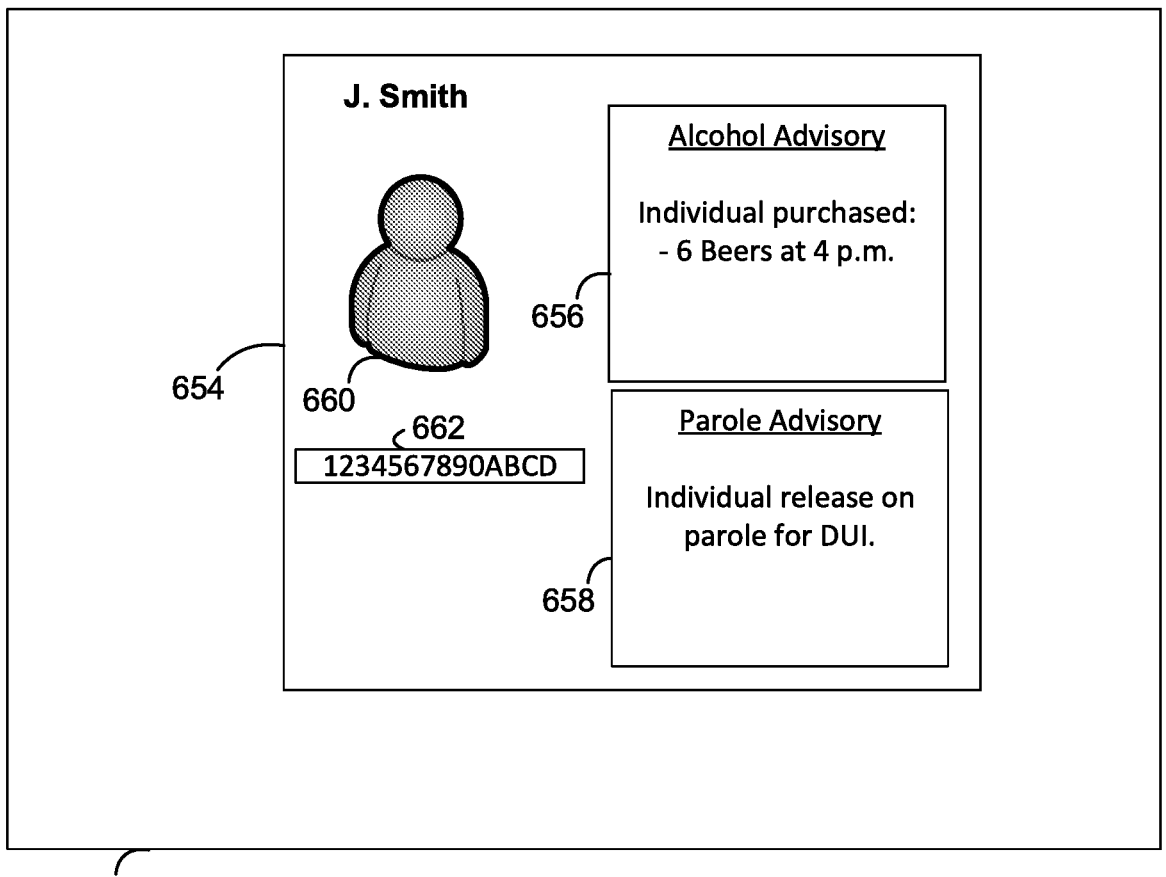
FIG. 6B is a user interface showing an advisory message of a retail management system for a law enforcement officer.

The processor unit 206 can also execute a user interface engine 212 that is used to generate various user interfaces, some examples of which are shown and described herein, such as in FIG. 6A-6B. The user interface engine 212 provides for point-of-sale interfaces for users to enter customer identifiers (which may be read by scanning an identification card, or manually entering information associated with the identifier), and the information may be processed by the authorization module 220. The user interface engine 212 further provides for law enforcement user interfaces that may be provided to law enforcement systems. User interface engine 212 may be an Application Programming Interface or a Web-based application that is accessible via the communication unit 202.

I/O unit 210 provides access to server devices including disks and peripherals. The I/O hardware provides local storage access to the programs running on remote service 200.

The power unit 214 provides power to the remote service 200.

Memory unit 208 may have an operating system 216, programs 218, authorization module 220, investigation module 221, user profile module 222, user profile database 224, transaction module 226, transaction database 228, and product database 230.

The operating system 216 may be a Microsoft Windows Server operating system, or a Linux-based operating system, or another operating system.

The programs 218 comprise program code that, when executed, configures the processor unit 206 to operate in a particular manner to implement various functions and tools for the remote service 200.

The authorization module 220 provides functionality to receive an authorization request from communication unit 202 and process it. This may involve querying the user profile database, the transaction database, and the product database. The authorization request received at the authorization module 220 may include one or more product identifiers from a venue, and a customer identifier.

Responsive to the authorization request, the authorization module 220 may generate an advisory response to the venue. The advisory response may indicate the customer's purchase history of controlled products. The advisory response may further indicate a success, a warning, or a failure status of the customer. The success, warning, and failure statuses may be determined by the authorization module 220 based on the user profile located in user profile database 224, transactions associated with the user profile in the transaction database 228, and products associated with the transactions in the product database 230. The authorization module 220 may receive an action from a point of sale system after sending an advisory response, and the advisory response may be stored along with the action, in order to track a venue's compliance with the advisory response. The advisory response may further indicate a number of refusal events of the customer at other venues. In a further embodiment, the advisory response may further include a theft indicator for the customer identifier used by the customer, which may indicate if the customer identifier has been stolen.

The investigation module 221 provides functionality to receive an investigation request from communication unit 202 and process it. This may involve querying the user profile database, the transaction database, and the product database. Further, the investigation module 221 may query a parole status for a user identified using an identifier from a correctional system. This parole status may further inform the law enforcement officer to identify individuals on parole, their particular parole conditions, and their purchase history of controlled substances. The investigation request received at the investigation module 221 may include a vehicle plate identifier and a driver identifier.

Responsive to the investigation request, the investigation module 221 may generate an investigation response to the law enforcement system generating the investigation request. The investigation response may indicate the customer's purchase history of controlled products. The investigation response may further indicate a success, a warning, or a failure status of the driver. The success, warning, and failure statuses may be determined by the investigation module 221 based on the user profile located in user profile database 224, transactions associated with the user profile in the transaction database 228, products associated with the transactions in the product database 230, and a parole indicia associated with the user as received from a correctional system.

The user profile module 222 provides functionality related to user profiles in the system for retail management of controlled substances. User profiles may be created by the user profile module 222 in response to a request from the authorization module 220 to the user profile module 222 based on an authorization request received at the authorization module 220, where the customer identifier received in the authorization request does not match an existing user profile in the user profile database 224. The user profile module 222 may read a user profile and provide it to the authorization module 220 or the investigation module 221 in response to a request from the authorization module 220 or the investigation module 221 based upon an authorization request where the user identifier matches an existing record in the user profile database. The user profile module 222 may further respond to an investigation request by reading a user profile if the driver identifier provided in the investigation request matches a user identifier in the user profile. The user profile module 222 may create, read, update, or delete database records from the user profile database 224.

The user profile module 222 may update a user profile in the user profile database 224 where an authorization request is received and there is a matching user profile with a matching user identifier already in the user profile database. The transaction information in this case may be added to the transaction database 228, and the newly created transaction records may be associated with the existing user profile in the user profile database 224.

The user profile module 222 may delete a user profile in the user profile database 224 for a user where it is determined that the user profile has no matching transaction records within a time threshold of the current time. For example, a user profile may be deleted if there are no matching transactions within a 72 hour time threshold from the current time.

Optionally, the user profile module 222 may store a wearable identifier associated with a user profile in addition to the customer identifier (or user identifier). The wearable identifier may correspond to a wearable device worn by a customer at a venue, and used for identification instead of a customer identifier such as a government issued identification card. In this case, the functionality associated with the user profile module 222 would apply to the wearable identifier. The wearable identifier may be issued at a venue for a particular event at the venue, or may alternatively be another identifier such as a loyalty card associated with the venue.

The user profile database 224 provides storage for user profiles, including user information associated with a customer identifier, such as a user's full name, address, age, or other biographical information. The user profile database 224 may also provide associated transaction identifiers for each user profile, the associated transaction identifiers corresponding to transaction records in the transaction database. The associated transaction identifiers may be a historical purchase record of the user of the controlled products. Optionally, the user profile database may store a wearable identifier that is associated with a user profile, for example, instead of a customer identifier from a government issued identification card, a wearable identifier may be issued to a customer and the wearable identifier may be used to identify a user profile instead of the identifier associated with the government issued identification card. Optionally, the user profile database may contain only the customer identifier, and may not include personally identifying information such as the biographical information. Optionally, if a user profile associated with a customer The user profile database 224 may be an SQL database, and may track various aspects of the user profile, including but not limited to, one or more user identifiers for each user, where the one or more user identifiers may correspond to government issued identifiers, and one or more vehicle identifiers associated with the user.

The transaction module 226 may provide functionality related to transaction information provided by the plurality of venues. The transaction module 226 may create, read, update, or delete transaction data stored in the transaction database 228. When the authorization module 220 receives an authorization request, it may call the transaction module to create transaction records corresponding to the customer identifier in the authorization request. The transaction records may be created in the transaction database 228 based upon the received transaction data in the authorization request, including but not limited to: time of the transaction, date of the transaction, a geographic location of the venue associated with the transaction, a venue identifier associated with the transaction, a venue type of the venue associated with the transaction, an area of the venue associated with the transaction (for example, a room in a restaurant), one or more product identifiers corresponding to one or more controlled products involved in the transaction, one or more product names associated with the one or more product identifiers, one or more unit costs associated with the one or more product identifiers, one or more subtotals associated with the one or more product identifiers, one or more product quantities associated with the one or more product identifiers, one or more tax status codes associated with the one or more product identifiers, a subtotal amount associated with the transaction, a tax amount associated with the transaction, a total amount associated with the transaction, payment card information corresponding to a method of payment for the transaction, a payment method type associated with the transaction, and other point-of-sale data provided in a transaction as known.

The transaction module 226 may read the transactions in the transactions database 228. For example, when the authorization module 220 receives an authorization request, it may call the transaction module 226 to request the transactions associated with the user profile identified by the authorization request.

The transaction module 226 may delete the transactions in the transactions database 228, either by removal from the transactions database 228 or by marking the transactions as "inactive". As described herein, the transaction module 226 may determine that one or more historical transactions associated with a user profile are from before a time threshold, and the transactions from before the time threshold may be deleted. The time threshold may be a number of hours, for example, 24 hours or 72 hours. The time threshold may be configurable be an administrator user.

The one or more product identifiers in each transaction record in the transaction database 228 may identify product records found in the product database 230.

The product database 230 may identify a listing of controlled products that may be purchased or served at the plurality of venues. The products may have product identifiers and alternate identifiers such as Stock Keeping Units (SKUs), Universal Product Codes (UPCs) and the like. The product records in product database may further include a product title, a controlled product type, a container type of the product, a typical pack size of the product, controlled product indicia (e.g. Alcohol-By-Volume values, etc.).

Figure 3:
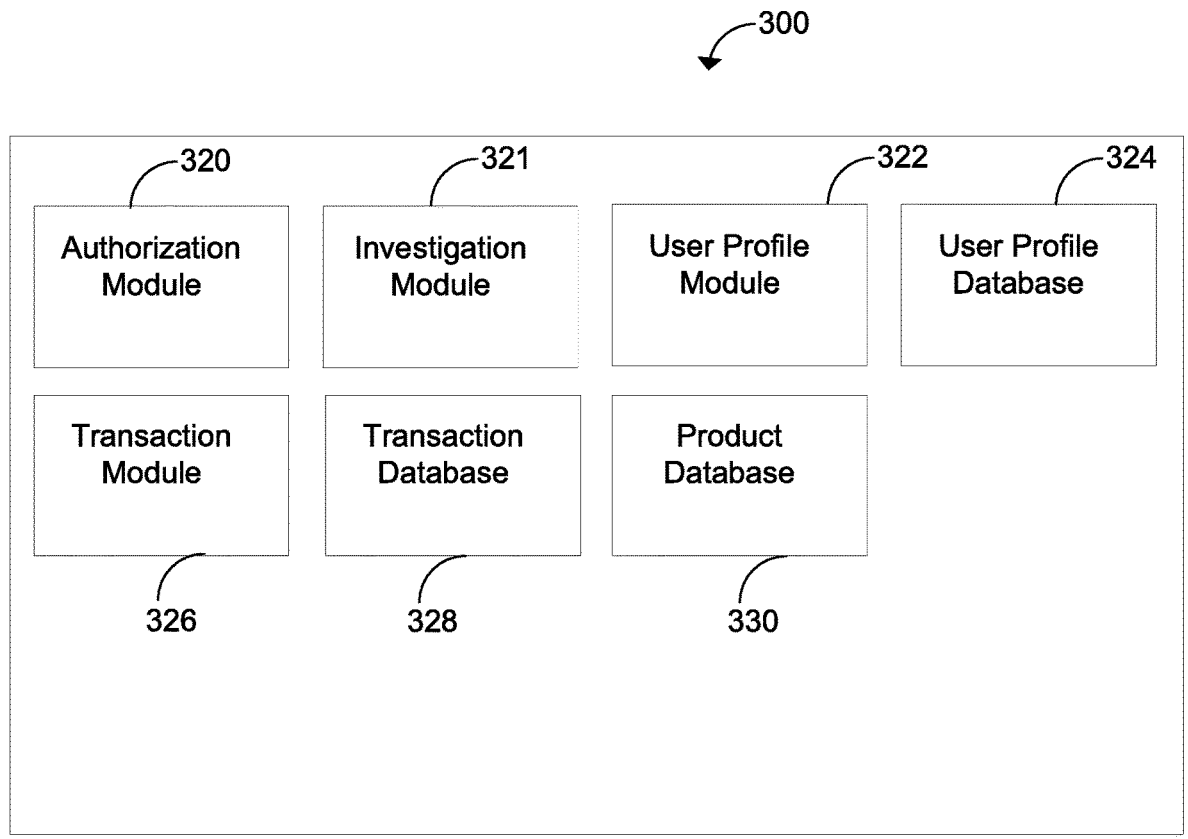
FIG. 3 is a software component diagram of the retail management system.

Referring to FIG. 3, there is shown a software component diagram 300 of the system for retail management of controlled substances in a retail environment. The system 300 includes an authorization module 320, investigation module 321, user profile module 322, user profile database 324, transaction module 326, transaction database 328, and product database 330.

Figure 4:
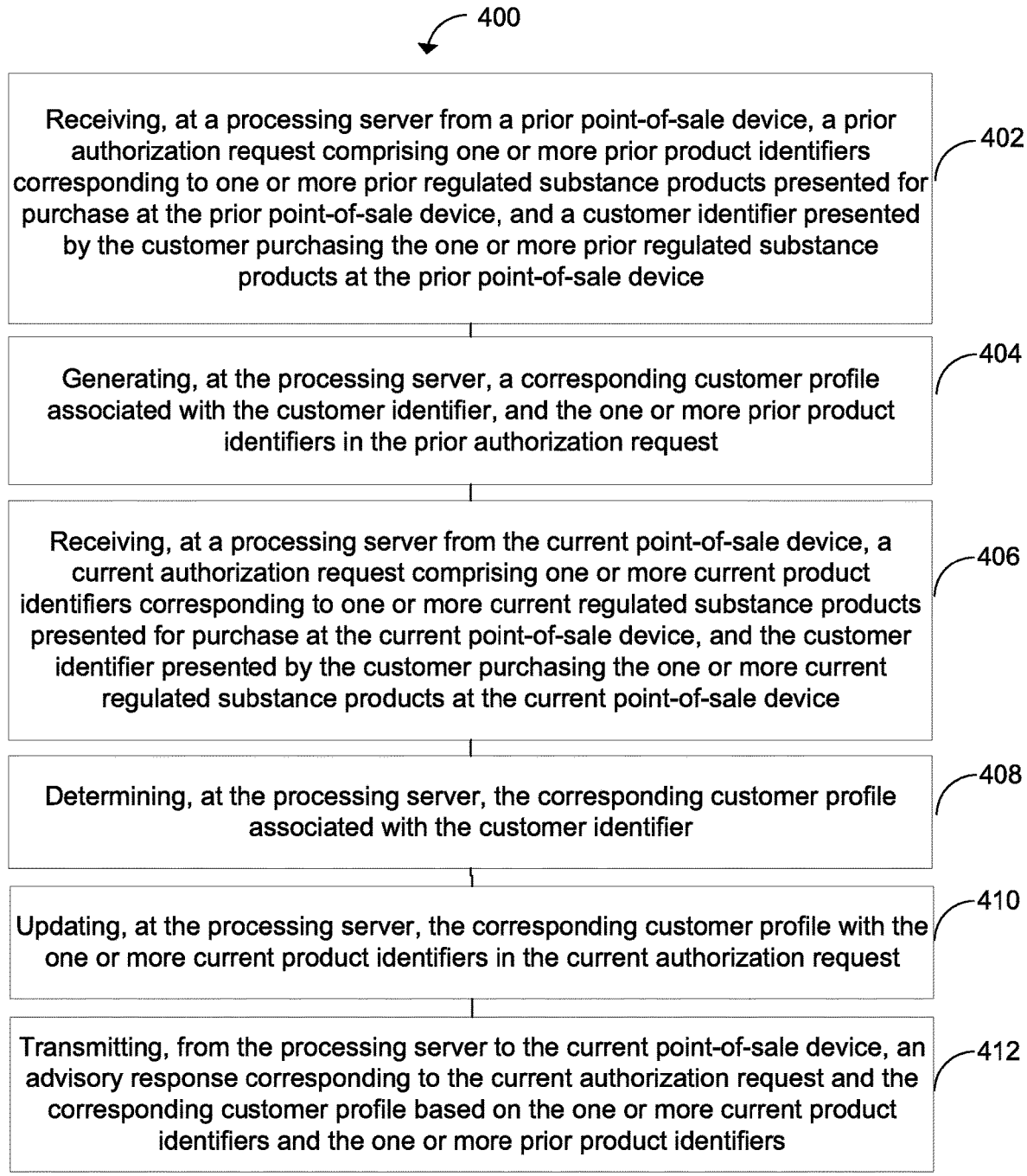
FIG. 4 is a flowchart of a method of retail management of controlled substances.

The authorization module 320 may implement the method found in FIG. 4, the authorization module 320 may receive an authorization request from a venue in the plurality of venues, and determines an advisory response to be sent back to the venue.

The advisory response may be determined from a user profile which the authorization module 320 receives from the user profile module 322, one or more transactions associated with the user profile received from the transaction module 326, one or more refusal events associated with the user profile received from the transaction module 326, and one or more products associated with the one or more transactions associated with the one or more transactions.

The advisory response may be in the form shown in FIG. 6A. The advisory response may include the user profile information from the user profile database 324, the transaction data from the transaction database 328, and product information from the product database 330. The advisory response may further include information relating to refusal events for other purchases that the customer has attempted at other venues. The advisory response may further include a theft indicator associated with the customer identifier, indicating, for example, that the user's identification card may have been stolen.

The advisory response may further include a status, the status may include a risk determination on a scale of 0-100 that may identify the likelihood that a customer has purchased or been served controlled products beyond a threshold. The advisory response status may also be a success status, a warning status, or a failure status. The success status may reflect a prediction that the sale or service of the controlled substance in the authorization request at the venue meets the venue's obligations. The warning status may indicate uncertainty about whether the sale or service of the controlled products in the authorization request meets the venue's obligations. The action taken by an employee at a venue in response to the authorization response may be recorded and transmitted to the remote service in order to track the venue's compliance. The failure status may indicate to the venue that the sale or service of the controlled product does not meet the venue's obligations. The advisory response may include a listing of the historical transaction associated with the user profile for review by a venue employee, including refusals of the customer for transactions. The advisory response may include a theft indicator for the customer identifier indicating that the identifier has been flagged as stolen.

Figure 5:
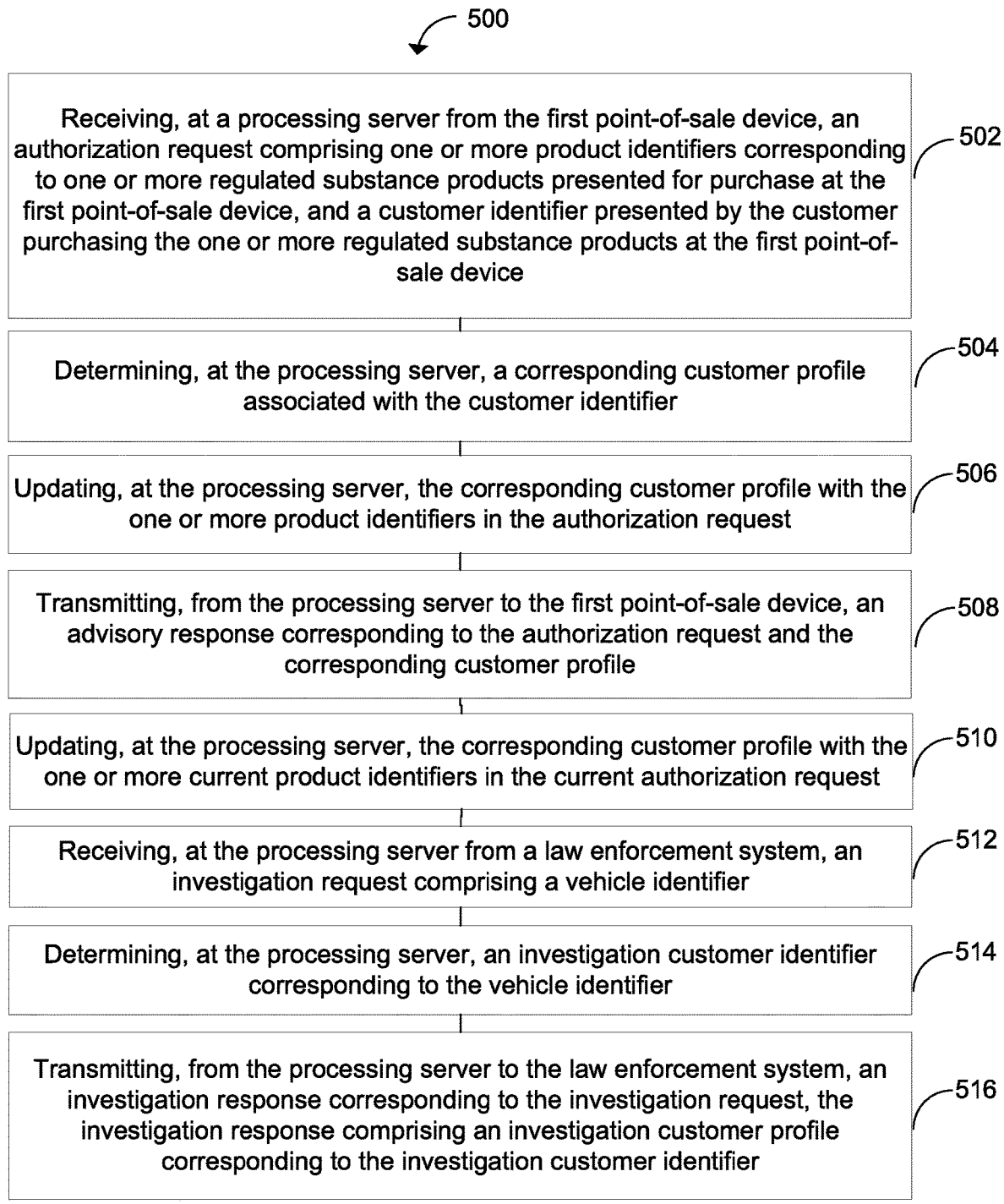
FIG. 5 is a flowchart of another method of retail management of controlled substances.

The investigation module 321 may implement the method found in FIG. 5. The investigation module 321 may receive an investigation request from a law enforcement system, including ones having license plate scanning systems. The investigation module 321 may determine an investigation response based on the investigation request to be sent to the law enforcement system.

The investigation response may be determined from a user profile which the investigation module 321 receives from the user profile module 322, one or more transactions associated with the user profile received from the transaction module 326, and one or more products associated with the one or more transactions associated with the one or more transactions.

The investigation response may be in the form shown in FIG. 6B. The investigation response may include the user profile information from the user profile database 324, the transaction data from the transaction database 328, and product information from the product database 330. The investigation response may further include correctional information such as parole information. The parole information may include a parole indicia indicating the status of the user's parole, and if there are any associated parole conditions that may be relevant to controlled substances. The parole information may be determined by the investigation module 321 making a correctional query request to a correctional system including a customer or user identifier, and receiving a corresponding query response.

The investigation response may further include a status, the status may include a risk determination on a scale of 0-100 that may identify the likelihood that a customer has purchased or been served controlled products beyond a threshold. The investigation response status may also be a success status, a warning status, or a failure status. The success status may reflect a prediction that the driver does pose a public safety concern based on their purchase history of controlled products. The warning status may indicate uncertainty about whether the driver identified in the investigation request poses a public safety concern. The failure status may indicate to the law enforcement officer that the driver identified in the investigation request likely poses a public safety concern. The investigation response may include a listing of the historical transactions associated with the user profile for review by a venue employee.

Referring to FIG. 4, there is a method diagram 400 for retail management of controlled substances.

At 402, receiving, at a processing server from a prior point-of-sale device, a prior authorization request comprising one or more prior product identifiers corresponding to one or more prior controlled substance products presented for purchase at the prior point-of-sale device, and a customer identifier presented by the customer purchasing the one or more prior controlled substance products at the prior point-of-sale device.

At 404, generating, at the processing server, a corresponding customer profile associated with the customer identifier, and the one or more prior product identifiers in the prior authorization request.

At 406, receiving, at a processing server from the current point-of-sale device, a current authorization request comprising one or more current product identifiers corresponding to one or more current controlled substance products presented for purchase at the current point-of-sale device, and the customer identifier presented by the customer purchasing the one or more current controlled substance products at the current point-of-sale device.

At 408, determining, at the processing server, the corresponding customer profile associated with the customer identifier.

At 410, updating, at the processing server, the corresponding customer profile with the one or more current product identifiers in the current authorization request.

At 412, transmitting, from the processing server to the current point-of-sale device, an advisory response corresponding to the current authorization request and the corresponding customer profile based on the one or more current product identifiers and the one or more prior product identifiers.

In a further embodiment, the advisory response may be further based on a time of purchase of the one or more prior controlled substance products represented by the one or more prior product identifiers.

In a further embodiment, the advisory response may be further based on a prior location type of the prior venue.

In a further embodiment, the advisory response may be further based on a current location type of the current venue.

In a further embodiment, the advisory response may be further based on a distance between the first venue and the second venue.

In a further embodiment, the advisory response may be further based on a transportation type used between the first venue and the second venue.

In a further embodiment, the advisory response may be further based on a product type corresponding to the one or more current product identifiers and the one or more prior product identifiers.

In a further embodiment, the advisory response may be further based on a container indicia of the one or more current controlled substance products represented by the one or more current product identifiers and a container indicia of the one or more prior controlled substance products represented by one or more prior product identifiers.

In a further embodiment, the advisory response may further include on one or more refusal events of the customer at other venues for sales or service of a controlled product.

In a further embodiment, the advisory response may further include a theft indicator for the customer identifier used by the customer, which may indicate if the customer identifier has been stolen.

Referring to FIG. 5, there is a method diagram 500 for another method of retail management of controlled substances.

At 502, receiving, at a processing server from the first point-of-sale device, an authorization request comprising one or more product identifiers corresponding to one or more controlled substance products presented for purchase at the first point-of-sale device, and a customer identifier presented by the customer purchasing the one or more controlled substance products at the first point-of-sale device.

At 504, determining, at the processing server, a corresponding customer profile associated with the customer identifier.

At 506, updating, at the processing server, the corresponding customer profile with the one or more product identifiers in the authorization request.

At 508, transmitting, from the processing server to the first point-of-sale device, an advisory response corresponding to the authorization request and the corresponding customer profile.

At 510, updating, at the processing server, the corresponding customer profile with the one or more current product identifiers in the current authorization request.

At 512, receiving, at the processing server from a law enforcement system, an investigation request comprising a vehicle identifier.

At 514, determining, at the processing server, an investigation customer identifier corresponding to the vehicle identifier.

At 516, transmitting, from the processing server to the law enforcement system, an investigation response corresponding to the investigation request, the investigation response comprising an investigation customer profile corresponding to the investigation customer identifier.

In a further embodiment, the customer identifier may be a government issued identifier.

In a further embodiment, the law enforcement system may be an optical license plate scanner.

In a further embodiment, the determining, at the processing server, the corresponding customer profile associated with the customer identifier may further comprise determining if there is not an existing customer profile and creating a new customer profile corresponding to the customer identifier.

In a further embodiment, the advisory response may further comprise an authorization status, the authorization status comprising a success, a warning, or a failure. In a further embodiment, an action is transmitted back to the remote service identifying the action taken by a venue in order to track compliance by the venue. For example, if the advisory response includes a failure status, and a transaction is subsequently performed at a venue for the controlled substance, this action may be reported to the remote service.

In a further embodiment, the updating, at the processing server, the corresponding customer profile with the one or more product identifiers in the authorization request may further comprise updating the corresponding customer profile with a transaction time, one or more product type identifiers corresponding to the one or more product identifiers, and a venue identifier corresponding to the first venue.

In a further embodiment, the customer profile and the investigation customer profile may further comprise historical purchase information for the customer.

In a further embodiment, the customer profile may further include one or more refusal events associated with the customer being refused service or sales of a controlled product at a venue.

Referring to FIG. 6A, there is shown a user interface diagram 600 showing an advisory response of a retail management system at a venue. The user interface 600 showing the advisory response 604 may be displayed at a point-of-sale device 602 at a venue. The point-of-sale device 602 may be a mobile device, such as a mobile phone using the Google® Android® operating system, or the Apple® iOS operating system. The point-of-sale device may alternatively be a payment card reader as known. The point-of-sale device 602 may be a desktop computer, a laptop computer, or another general purpose computing device.

The advisory response 604 may be displayed on a display 610 of the point-of-sale device 602. The advisory response 604 may include user profile information such as the customer's name, an image associated with the customer 608, a customer identifier associated with the customer's identifier 612, and advisory text 606. The advisory text 606 may include a purchase history of a controlled product received from the retail management system. This advisory text may include an amount of controlled product, a time of purchase of the controlled product, or any other piece of data associated with the advisory response 604. The advisory text 606 may further include information related to one or more refusal events associated with the customer at other venues. The advisory text 606 may further indicate a theft indicator associated with the customer identifier used by the customer.

The venue employee, in receipt of the advisory message, may thus be informed of the information in the advisory message when discharging their obligations to public safety when selling or serving the customer a controlled product.

Referring to FIG. 6B, there is shown a user interface diagram 650 showing an investigation response of a retail management system to a law enforcement system 652. The user interface 650 showing the investigation response 654 may be displayed at a law enforcement system 652 for a law enforcement officer. The law enforcement system 652 may be a mobile device, such as a mobile phone using the Google® Android® operating system, or the Apple® iOS operating system. The law enforcement system 652 may alternatively be a system integrated with a law enforcement vehicle, such as an onboard computer system. The law enforcement system 652 may be a desktop computer, a laptop computer, or another general purpose computing device.

The investigation response 654 may be displayed on a display of the law enforcement system 652. The investigation response 654 may include user profile information such as the customer's name, an image associated with the customer 660, a user identifier associated with the customer's identifier 662, investigation text 656, and parole indicia 658. The investigation text 656 may include a purchase history of a controlled product received from the retail management system. This investigation text 656 may include an amount of controlled product, a time of purchase of the controlled product, or any other piece of data associated with the investigation response 654.

The law enforcement officer, in receipt of the investigation response, may thus be informed of the information in the investigation response when discharging their obligations to public safety when patrolling public roadways in order to identify drivers having purchased controlled products or having been served controlled products.

Figure 7A:
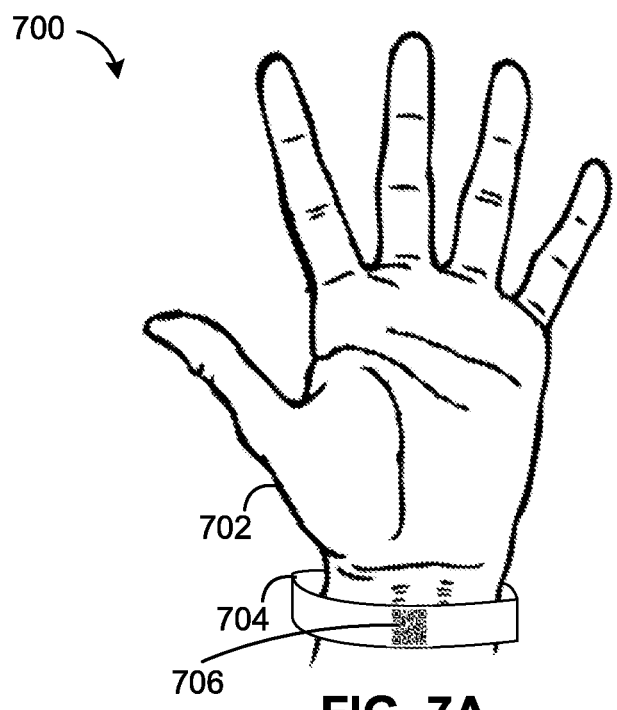
FIG. 7A is an example of a wearable identifier of a retail management system.

Referring next to FIG. 7A, there is shown perspective view 700 of a wearable device 704 of a retail management system. The wearable device 704 may be attached around a customer's wrist below the customer's hand 702. The wearable device 704 has a wearable identifier 706. At a venue, a customer may be issued a wearable device 704 after reading their customer identification (for example government issued identification). The retail management system may store the wearable identifier and the customer identifier in the user profile for the user, and subsequently the user may present the wearable device 704 at a point-of-sale device at the venue when purchasing a controlled substance at the venue. The wearable devices 704 may be used in situations where high-volume purchases occur at a point-of-sale device, such as at a sports stadium, an auto-race, a movie-theatre, a concert, or another public event. The wearable identifier may be a Quick Reference (QR) code that may be optically read at the point-of-sale. The wearable device 704 may be substantially fixed on the user's wrist, and removable only by destroying the wearable device 704 and rendering it unusable.

Figure 7B:
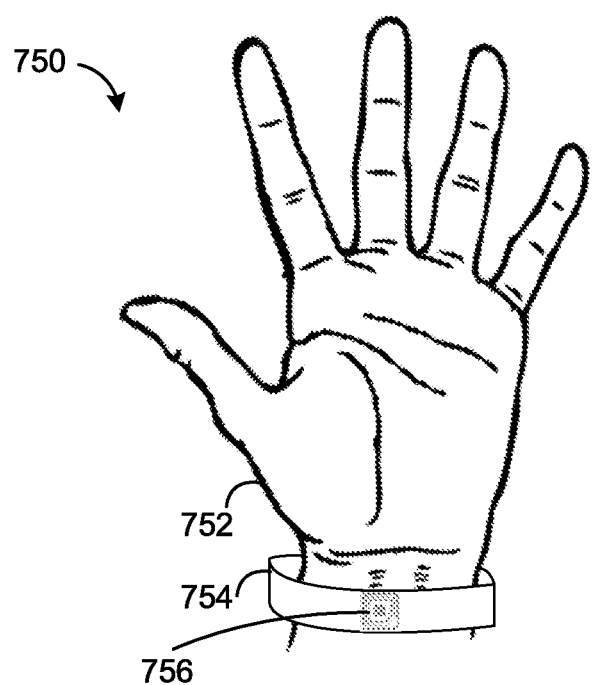
FIG. 7B is another example of a wearable identifier of a retail management system.

Referring next to FIG. 7B, there is shown perspective view 750 of an alternate wearable device 754, attached around a customer's wrist below the hand 752. In this alternate embodiment, an Radio-Frequency Identification device 756 may be used. The RFID identifier 756 may be read at a point-of-sale device using an RFID reader. In other embodiments, other identifiers may be used as well, including barcodes, Near-Field Communication (NFC) devices, etc.

I claim:

1. A method for retail management of controlled substances at a current venue, the current venue comprising a current retailer point-of-sale device, the method comprising:
receiving, at a processing server from a prior retailer point-of-sale device, a prior authorization request comprising one or more prior product identifiers corresponding to one or more prior controlled substance products presented for purchase at the prior retailer point-of-sale device, and a customer identifier presented by the customer purchasing the one or more prior controlled substance products at the prior retailer point-of-sale device, the prior authorization request corresponding to the customer identifier;
generating, at the processing server, a corresponding customer profile associated with the customer identifier, and the one or more prior product identifiers in the prior authorization request;
receiving, at a processing server from the current retailer point-of-sale device, a current authorization request comprising one or more current product identifiers corresponding to one or more current controlled substance products presented for purchase at the current retailer point-of-sale device, and the customer identifier presented by the customer purchasing the one or more current controlled substance products at the current retailer point-of-sale device, the current authorization request corresponding to the customer identifier;
determining, at the processing server, the corresponding customer profile associated with the customer identifier;
updating, at the processing server, the corresponding customer profile with the one or more current product identifiers in the current authorization request;
transmitting, from the processing server to the current retailer point-of-sale device, an advisory response corresponding to the current authorization request and the corresponding customer profile based on the one or more current product identifiers and the one or more prior product identifiers.

2. The method of claim 1, wherein the advisory response is further based on a time of purchase of the one or more prior controlled substance products represented by the one or more prior product identifiers.

3. The method of claim 2, wherein the advisory response is further based on a prior location type of a prior venue.

4. The method of claim 3, wherein the advisory response is further based on a current location type of the current venue.

5. The method of claim 4, wherein the advisory response is further based on a distance between the prior venue and the current venue.

6. The method of claim 5, wherein the advisory response is further based on a transportation type used between the prior venue and the current venue.

7. The method of claim 6, wherein the advisory response is further based on a product type corresponding to the one or more current product identifiers and the one or more prior product identifiers.

8. The method of claim 7, wherein the advisory response is further based on a container indicia of the one or more current controlled substance products represented by the one or more current product identifiers and a container indicia of the one or more prior controlled substance products represented by one or more prior product identifiers.

9. The method of claim 8, wherein the advisory response further comprises one or more refusal events.

10. The method of claim 9, wherein the advisory response further comprises a theft indicator associated with the customer identifier.

11. A system for retail management of controlled substances at a current venue, the current venue comprising a current retailer point-of-sale device, the method comprising:
a processing server, the processing server comprising:
a memory;
a network device; and
a processor in communication with the memory and the network device, the processor configured to:
receive, at the network device from a prior retailer point-of-sale device, a prior authorization request comprising one or more prior product identifiers corresponding to one or more prior controlled substance products presented for purchase at the prior retailer point-of-sale device, and a customer identifier presented by the customer purchasing the one or more prior controlled substance products at the prior retailer point-of-sale device, the prior authorization request corresponding to the customer identifier;
generate a corresponding customer profile associated with the customer identifier, and the one or more prior product identifiers in the prior authorization request;
receive, at the network device from the current retailer point-of-sale device, a current authorization request comprising one or more current product identifiers corresponding to one or more current controlled substance products presented for purchase at the current retailer point-of-sale device, and the customer identifier presented by the customer purchasing the one or more current controlled substance products at the current retailer point-of-sale device, the prior authorization request corresponding to the customer identifier;
determine the corresponding customer profile associated with the customer identifier;
update the corresponding customer profile with the one or more current product identifiers in the current authorization request;
transmit, from network device to the current retailer point-of-sale device, an advisory response corresponding to the current authorization request and the corresponding customer profile based on the one or more current product identifiers and the one or more prior product identifiers.

12. The system of claim 11, wherein the advisory response is further based on a time of purchase of the one or more prior controlled substance products represented by the one or more prior product identifiers.

13. The system of claim 12, wherein the advisory response is further based on a prior location type of a prior venue.

14. The system of claim 13, wherein the advisory response is further based on a current location type of the current venue.

15. The system of claim 14, wherein the advisory response is further based on a distance between the prior venue and the current venue.

16. The system of claim 15, wherein the advisory response is further based on a transportation type used between the prior venue and the current venue.

17. The system of claim 16, wherein the advisory response is further based on a product type corresponding to the one or more current product identifiers and the one or more prior product identifiers.

18. The system of claim 17, wherein the advisory response is further based on a container indicia of the one or more current controlled substance products represented by the one or more current product identifiers and a container indicia of the one or more prior controlled substance products represented by one or more prior product identifiers.

19. The system of claim 18, wherein the advisory response further comprises one or more refusal events.

20. The system of claim 19, wherein the advisory response further comprises a theft indicator associated with the customer identifier.

* * * * *